(12) United States Patent
Pollock et al.

(10) Patent No.: US 9,054,602 B2
(45) Date of Patent: Jun. 9, 2015

(54) RESONANT CIRCUIT WITH CONSTANT CURRENT CHARACTERISTICS

(76) Inventors: Helen Pollock, Oakham (GB); Charles Pollock, Oakham (GB)

( * ) Notice: Subject to any disclaimer, the term of this patent is extended or adjusted under 35 U.S.C. 154(b) by 116 days.

(21) Appl. No.: 12/965,090

(22) Filed: Dec. 10, 2010

(65) Prior Publication Data

US 2012/0147628 A1 Jun. 14, 2012

(51) Int. Cl.
*H02M 3/335* (2006.01)
*H02M 7/5383* (2007.01)
(Continued)

(52) U.S. Cl.
CPC ............ *H02M 7/5383* (2013.01); *H02M 7/155* (2013.01); *H02M 2001/0058* (2013.01); *H02M 2001/0087* (2013.01); *Y02B 70/1441* (2013.01); *Y02B 70/1491* (2013.01)

(58) Field of Classification Search
USPC ........... 363/15–17, 22–23, 27–28, 31, 37, 40, 363/55, 56.01–56.02, 57, 74–75, 78–79, 363/95–98, 131–134, 165, 170–173, 21.02; 307/60
See application file for complete search history.

(56) References Cited

U.S. PATENT DOCUMENTS 4,559,590 A * 12/1985 Davidson .................... 363/21.02
4,823,249 A * 4/1989 Garcia, II ........................ 363/48

(Continued)

FOREIGN PATENT DOCUMENTS

WO 2008/120019 A1 10/2008
WO WO 2011-031169 * 3/2011

OTHER PUBLICATIONS

H. Pollock, "Simple constant frequency constant current load-resonant power supply under variable load conditions", IEE Electronic Letters, vol. 33, No. 18, Aug. 28, 1997, pp. 1505-1506.
(Continued)

*Primary Examiner* — Adolf Berhane
*Assistant Examiner* — Nusrat Quddus
(74) *Attorney, Agent, or Firm* — Renner, Otto, Boisselle & Sklar, LLP

(57) ABSTRACT

An electronic resonant circuit of very high efficiency which is suitable for driving loads with a known and controlled current. The resonant circuit has input terminals and output terminals with a first reactance Xs, in series with an input terminal, a second reactance $X_L$, in series with an output terminal, and a reactance $X_p$, connected such that there is a series connection path between the first input terminal through $X_s$ and $X_p$ to the second input terminal and such that there is also a second series connection path between the first output terminal through $X_L$ and $X_p$ to the second output terminal the input terminals being driven from a high frequency inverter, the output terminals being connected to a load, the value of the reactances $X_s$, $X_L$ and $X_p$ being chosen such that at least one frequency, the reactances of $X_s$, $X_L$ and $X_p$ are approximately similar in magnitude. The reactance Xs and second reactance $X_L$, are predominantly capacitive over a wide range of the frequency of operation and the reactance $X_p$, is predominantly inductive over a wide range of the frequency of operation. The circuit according to this invention is particularly suited to driving LED lighting systems, constant torque motors, battery charging and capacitor charging.

4 Claims, 5 Drawing Sheets

(51) Int. Cl.
  *H02M 3/338* (2006.01)
  *H02M 7/155* (2006.01)
  *H02M 1/00* (2006.01)

(56) References Cited

U.S. PATENT DOCUMENTS

| | | | |
|---|---|---|---|
| 4,833,584 A * | 5/1989 | Divan | 363/37 |
| 7,643,314 B2 * | 1/2010 | Sato | 363/21.02 |
| 7,869,230 B2 * | 1/2011 | Huang et al. | 363/21.02 |
| 7,889,519 B2 * | 2/2011 | Perreault et al. | 363/21.02 |
| 2009/0059634 A1 * | 3/2009 | Otake | 363/132 |
| 2010/0244788 A1 * | 9/2010 | Chen | 323/234 |
| 2011/0002145 A1 * | 1/2011 | Halberstadt | 363/21.02 |
| 2011/0038181 A1 * | 2/2011 | Yan et al. | 363/17 |

OTHER PUBLICATIONS

H. Pollock, "Constant frequency, constant current load resonant capacitor charging power supply", IEE Proc. Electric Power Applications, vol. 146, No. 2, Mar. 1999, pp. 187-192.

Borage et al., "Analysis and Design of an LCL-T Resonant Converter as a Constant-Current Power Supply", vol. 52, No. 6, Dec. 2005, pp. 1547.

Borage et al., "LCL-T Resonant Converter with clamp diodes: A novel Constant-Current Power Supply with inherent constant voltage limit".

Duplicate reference to "Simple constant frequency current load-resonant power supply under variable load conditions".

"LCL" half-bridge series-parallel load resonant converter as published in IEE Electronic Letters, vol. 33, No. 18, Aug. 28, 1997, pp. 1505.

* cited by examiner (a) LCL (Prior Art) Magnitude of Admittance of Z (b) LCL (Prior Art) Phase Angle of Impedance Z (c) LCL (Prior Art) Load Current (a) CLC Input Admittance of Z (b) CLC Phase Angle of Impedance Z (c) CLC Load Current

RESONANT CIRCUIT WITH CONSTANT CURRENT CHARACTERISTICS

TECHNICAL FIELD OF THE INVENTION

The present invention relates to a resonant circuit with inherent constant current characteristics such that the current supplied to a load remains constant irrespective of the value or type of the load. The invention is particularly suitable for driving light emitting diodes, laser diodes, capacitor chargers, battery chargers and constant torque electric motors.

BACKGROUND OF THE INVENTION

During battery charging it is desirable to deliver a constant current to the battery regardless of battery state of charge or temperature. Prior art circuits to achieve this often require measurement of the current and control of a switching circuit to achieve constant current.

A capacitor charging power supply needs to charge a capacitor from zero voltage to a maximum value. When the capacitor is initially discharged it appears as a short circuit to the charging circuit. Under these conditions the current delivered to it must not exceed the rating of the circuit components.

A constant torque motor is obtained by delivering constant current to the motor irrespective of its speed. A constant torque servo motor can be used for example in robotic applications where the robot grip force can be set by the motor torque limit irrespective of the type of object which is lifted.

Light emitting diodes (LED) and laser diodes also have a requirement to be driven from a constant current supply. The forward voltage of a light emitting diode varies slightly with component tolerances. If a conventional DC to DC power supply was used to drive a range of LEDs without current feedback the current through the LEDs would vary dependent on their forward voltage. Furthermore the forward voltage characteristic varies with temperature. The intensity of the light output would not be constant unless current feedback was added to maintain the current to be constant.

There are therefore many applications where a constant current power supply is desirable. It would be a major advantage if a circuit could be designed to automatically set the current supplied to a load without requiring the complexity of measuring the current and having a closed loop current controlled power supply. Such complexity increases the cost of the power supply circuit. The measurement of the current may require the current to be measured in a part of the circuit which is electrically isolated from the main controller, adding further complexity and cost.

Current measurement circuits employing current sense resistors introduce energy losses which reduce the efficiency of the circuit. Energy efficiency is very important in power supply circuits for all applications. It is particularly important in battery chargers for all applications from portable appliances to electric vehicles. Power supply circuits for LED lighting must be highly efficient as they will be used for long periods of time.

FIG. 1 shows a half bridge inverter circuit connected to an LCL resonant circuit as published in "Simple constant frequency constant current load-resonant power supply under variable load conditions" by H. Pollock, IEE Electronics Letters, Vol. 33. No. 18, 28 Aug. 1997, pp. 1505-1506 and in "Constant frequency, constant current load resonant capacitor charging power supply" by H. Pollock, IEE Proc. Electric Power Applications, Vol. 146, No. 2, March 1999, pp. 187-192. This paper introduced a resonant circuit containing an inductor-capacitor-inductor (T-resonant) arrangement with the load connected in series with the second inductor. The paper reported the discovery that if the two inductors were equal and the circuit was operated at a frequency at which the magnitude of the reactance of the capacitor was also equal to the reactance of the inductors, then the magnitude of the load current was completely independent of the value of the load resistance.

The constant current aspect of the LCL resonant circuit presented in IEE Proc. Electric Power Applications, Vol. 146, No. 2, March 1999, pp. 187-192 was used by Borage, Tiwari and Kotaiah in "Analysis and Design of an LCL-T Resonant Converter as a Constant-Current Power Supply", published in IEEE Trans. on Industrial Electronics, Vol. 52, No. 6, December 2005, pp. 1547 and further refined by the same authors in "LCL-T Resonant Converter with clamp diodes: A novel Constant-Current Power Supply with inherent constant voltage limit".

The constant current characteristics of the LCL circuit have been utilised to drive LEDs in "Improvements Relating to Lighting Systems", WO/2008/120019.

Whilst the LCL resonant converters published in the prior art deliver natural constant current characteristics they have three major disadvantages:

1. The circuits require two high frequency inductors of approximately equal value. The inductors operate at the switching frequency of the circuits which is typically tens of kHz. High frequency inductors suffer from eddy current and hysteresis losses in the cores and skin and proximity effects in the conductors. They are difficult to construct with low losses and since the LCL circuit has two inductors the losses are high.
2. The circuit has a path for dc current to flow through the two inductors and the load. Imbalances of the switch timing between the upper and lower switching transistor in the inverter can cause the mid-point of the dc splitting capacitors to drift substantially from the half the dc supply.
3. The circuit has another resonant frequency, higher than the resonant frequency used for constant current operation. As a result driving the circuit with a square wave voltage at the normal operating frequency will allow harmonics of the fundamental voltage to excite currents close to the higher resonant frequency. As a result distortion of the switch current, away from the pure sinusoidal current desirable for high efficiency, occurs. This distortion causes switching losses and reduces the efficiency of the circuit.

SUMMARY OF THE INVENTION

It is the object of this invention to provide a power supply circuit which overcomes the disadvantages of the prior art LCL-T resonant circuit. A circuit according to the invention can be designed to take a given supply voltage and deliver a pre-set current to a load irrespective of variations in the load characteristics such as its voltage or resistance. It is a further object of this invention to provide significant improvements over the prior art constant current LCL resonant circuit topology to provide a constant current power supply of very high efficiency.

An electronic circuit incorporating a resonant circuit with input terminals and output terminals with a first reactance Xs, in series with an input terminal, a second reactance $X_L$, in series with an output terminal, and a reactance $X_p$, connected such that there is a series connection path between the first input terminal through $X_s$ and $X_p$ to the second input terminal and such that there is also a second series connection path between the first output terminal through $X_L$ and $X_p$ to the second output terminal the input terminals being driven from a high frequency inverter, the output terminals being connected to a load, the value of the reactances $X_s$, $X_L$ and $X_p$ being chosen such that at least one frequency, the reactances of $X_s$, $X_L$ and $X_p$ are approximately similar in magnitude and that the first reactance Xs and second reactance $X_L$, are predominantly capacitive and the reactance $X_p$, is predominantly inductive near to the frequency of operation.

In a further embodiment the electronic circuit incorporates a high frequency inverter which is a current source inverter.

BRIEF DESCRIPTION OF THE DRAWINGS

The invention will now be described with reference to the following drawings.

DETAILED DESCRIPTION OF THE INVENTION

Figure 1:
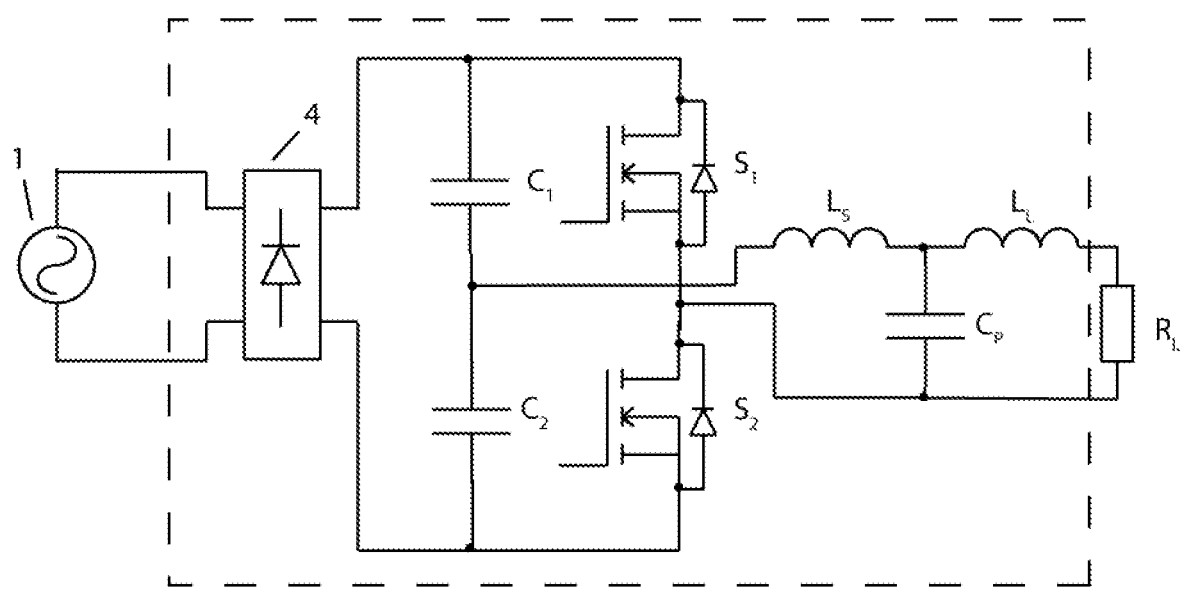
FIG. 1 shows an inverter incorporating an LCL resonant circuit according to the prior art.

FIG. 1 shows an LCL half-bridge series-parallel load resonant converter as published in IEE Electronics Letters, Vol. 33. No. 18, 28 Aug. 1997, pp. 1505. Two switches S1 and S2 are used in conjunction with two capacitors C1 and C2 to apply a square wave voltage across an LCL resonant circuit incorporating a transformer rectifier and load. The resonant circuit comprises an inductor $L_s$ in series with the whole circuit, a further inductor $L_L$ in series with the load and transformer and a capacitor, $C_P$ in parallel with $L_L$ and the load.

Figure 2:
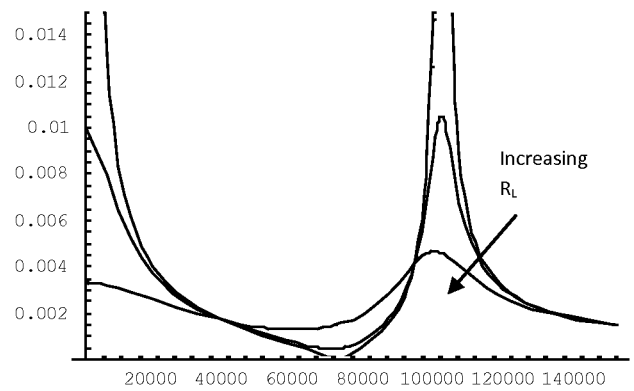
FIG. 2 shows the frequency variation of the admittance, phase angle and load current of the LCL resonant circuit of the prior art.
Figure 2:
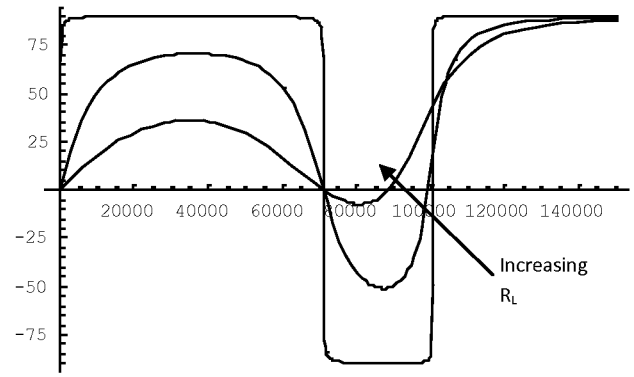
Figure 2:
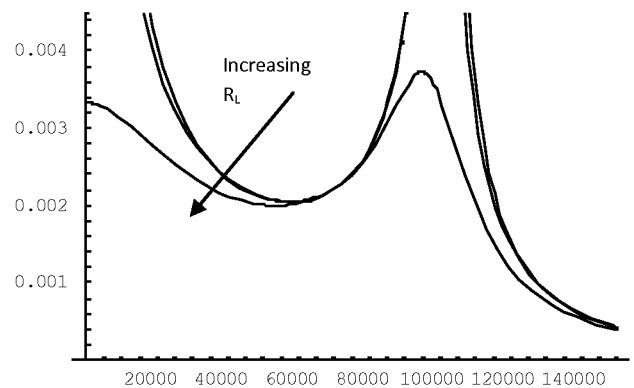

FIG. 2 (*a*) shows the variation in the magnitude of the admittance of a typical LCL resonant circuit at three different values of load and over a range of frequencies. FIG. 2(*b*) shows the phase angle of the impedance of the LCL resonant circuit at three different values of load. At zero Hz the reactance of the inductors $L_s$ and $L_L$ are zero and so the circuit has zero phase since the load resistance is directly seen by the inverter. As the frequency increases the inductors dominate making the circuit highly inductive. At the first non-zero resonant frequency the LCL circuit changes from inductive (positive phase angle of impedance) to capacitive (negative phase angle of impedance) and then at the second (upper) resonant frequency the circuit changes from capacitive (negative phase) back to inductive (positive phase).

From the prior art it is known that the resonant frequencies of the LCL resonant circuit are:

$\omega_{0_{LCL}} = 0$ rad/s;

the first, non-zero resonant frequency, $$\omega_{1_{LCL}} = \frac{1}{\sqrt{L_s C_p}} \text{rad/s};$$

and the second, non-zero resonant frequency, $$\omega_{2_{LCL}} = \sqrt{\frac{2L_s - C_p R_L^2}{C_p L_s^2}} \text{ rad/s}.$$

The prior art has highlighted the constant current characteristic of the LCL resonant circuit which occurs at the first non-zero resonant frequency, $\omega_{1_{LCL}}$.

At this frequency the current in the inductor $L_L$ and the load, $R_L$, is constant even with changes in the load.

The current in the load leg of the LCL circuit at any frequency is given by:

$$i_{L_L} = \frac{V X_{C_p}}{R_L X_{L_s} + R_L X_{C_p} + j(X_{L_s} X_{C_p} + X_{L_L} X_{L_s} + X_{L_L} X_{C_p})}$$

Where $X_{L_s}$, $X_{L_L}$, $X_{C_p}$ are the reactances of the components $L_s$, $L_L$ and $C_p$ respectively, V is the excitation voltage, $R_L$ is the effective resistance of the load and j is the reactive component.

If the component values are chosen such that $X_{L1} = X_{L2} = -X_{C1}$ the above equation simplifies to $$i_{L_L} = \frac{V}{-j X_{C_p}}$$

$X_{C1}$ is negative since the reactance of a capacitor is negative.

The current in the load of the LCL resonant circuit is independent of the load and is proportional to the input supply voltage when $X_{L1} = X_{L2} = -X_{C1}$. FIG. 2(*c*) shows the variation in the load current with frequency and at three different values of load resistance. In this example, at a frequency of approximately 72 kHz the load currents shown in FIG. 2(*c*) are the same regardless of the values of $R_L$.

Rearranging the equation for the second non-zero resonant frequency, $\omega_{2LCL}$, gives, $$\omega_{2_{LCL}} = \frac{\sqrt{2}}{\sqrt{C_p L_s}} - \frac{R_L}{L_s} = \sqrt{2}\, \omega_{1_{LCL}} - \frac{R_L}{L_s} \text{rad/s}.$$

Therefore, the second non-zero resonant frequency is greater than the first while $$R_L < (\sqrt{2} - 1)\omega_{1_{LCL}} L_s$$

$$R_L < (\sqrt{2} - 1)\sqrt{\frac{L_s}{C_p}}$$

Therefore $R_{L_{maxLCL}} = (\sqrt{2} - 1)\sqrt{\frac{L_s}{C_p}}$

Hence it can be seen that for this circuit to work with distinct resonant frequencies over a wide range of $R_L$ the value of $L_s$ needs to be chosen to be large. Unfortunately, to maintain the constant current characteristic of the circuit, this means that the value of $L_L$ also needs to be the same large value. Since inductor losses are the dominant loss mechanism in this circuit, large inductors result in higher losses and lower efficiency. It is therefore difficult to design the LCL resonant circuit to have distinct resonant frequencies and high efficiency over a wide range of load resistance $R_L$.

Whilst the LCL resonant converters published in the prior art deliver natural constant current characteristics at one of the resonant frequencies, the LCL resonant circuit has three major disadvantages:

1. The circuits require two high frequency inductors of approximately equal value. The inductors operate at the switching frequency of the circuits which is typically tens of kHz. High frequency inductors suffer from eddy current and hysteresis losses in the cores and skin and proximity effects in the conductors. They are difficult to construct with low losses and since the LCL circuit has two inductors the losses are high.
2. The circuit has a path for dc current to flow through the two inductors and the load. This is illustrated by the zero phase at zero frequency (DC) in FIG. 2. Imbalances of the switch timing between the upper and lower switching transistor in the inverter can cause dc currents to flow through the circuit. These dc currents cause the midpoint of the dc splitting capacitors to drift substantially from the half the dc supply, reducing the maximum power output of the circuit. Furthermore, the high frequency inductors carry dc current in addition to the high frequency components. The dc current in the inductors can cause premature saturation in one half of the high frequency cycle, further increasing the asymmetric operation of the circuit. This reduces the efficiency of the circuit. The high currents which can flow in the prior art circuit at low frequencies is clear from the rapid rise in the admittance plot in FIG. 2(a) as the frequency approaches zero.
3. The second non-zero resonant frequency is higher than the resonant frequency used for constant current operation. As a result when driving the circuit in constant load current mode, with a square wave voltage at or close to the first non-zero resonant frequency will allow harmonics of the fundamental voltage to excite currents close to the higher resonant frequency. As a result distortion of the switch current occurs. This makes the current in the switches non-sinusoidal. As a result of this non-sinusoidal current, the current in the switches does not return naturally to zero and switching losses occur, reducing the efficiency of the circuit.

The LCL resonant circuit therefore cannot be designed to have the highest possible efficiency over the whole range of loads and component tolerances.

Figure 3:
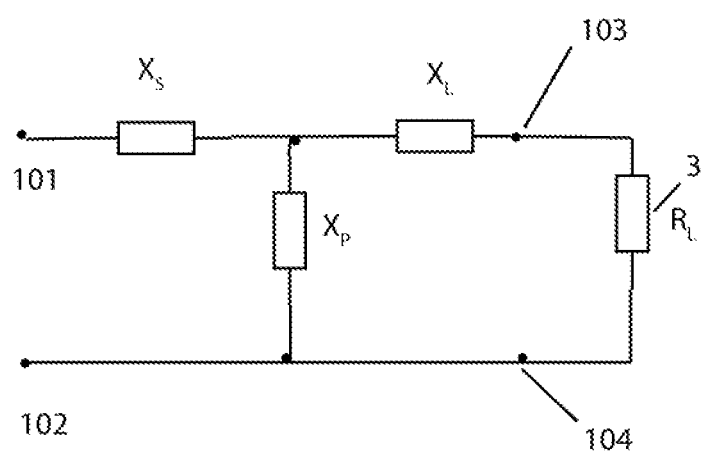
FIG. 3 shows a resonant circuit according to the invention.

FIG. 3 shows a resonant circuit according to the invention which is a circuit which does not suffer from the disadvantages of the prior art. The circuit according to the invention contains a first reactance $X_s$ in series with the incoming supply connection, 101. A second reactance $X_L$ is in series with the load, $R_L$. A reactance $X_p$ is in parallel with the series connected $R_L$ and $X_L$. As an alternative to the connections shown in FIG. 3, the reactance $X_L$ could be connected from the bottom side of Xp to the lower output terminal instead of the illustrated position between 103 and the upper connection between $X_s$ and $X_p$.

In order to implement the invention the first and second reactances are predominantly capacitive over most of the frequency range of the circuit whereas the further reactance $X_p$ is predominantly inductive. This circuit according to the invention can be referred to as a CLC resonant circuit.

This circuit has two frequencies where the phase angle of the circuit impedance measured at the input terminals 101 and 102 is zero.

The first resonant frequency, $$\omega_{1_{CLC}} = \sqrt{\frac{1}{2C_s L_p - C_s^2 R_L^2}} \text{ rad/s;}$$

And the second resonant frequency, $$\omega_{2_{CLC}} = \frac{1}{\sqrt{C_s L_p}} \text{ rad/s.}$$

If the CLC circuit according to the invention is designed such that $-X_{C_s}=-X_{C_L}=X_{L_p}$ then at the second resonant frequency the current in the load;

$$i_{C_L} = \frac{V X_{C_p}}{R_L X_{C_s} + R_L X_{L_p} + j(X_{C_s} X_{L_p} + X_{C_L} X_{C_s} + X_{C_L} X_{L_p})}$$

Which at the second resonant frequency simplifies to $$i_{C_L} = \frac{V}{j X_{L_p}}$$

At the second resonant frequency the CLC circuit according to the invention therefore delivers constant current to a load irrespective of the value of the load resistance.

The CLC circuit according to the invention overcomes the first disadvantage of the LCL prior art circuit. Since the CLC resonant circuit has only one inductor compared to the two inductors in LCL, the CLC and since the loss per joule of energy stored in a capacitor is much less than the loss per joule of energy stored in an inductor, the total losses for a circuit according to the invention, at a given output power and operating frequency will be significantly lower.

Figure 4:
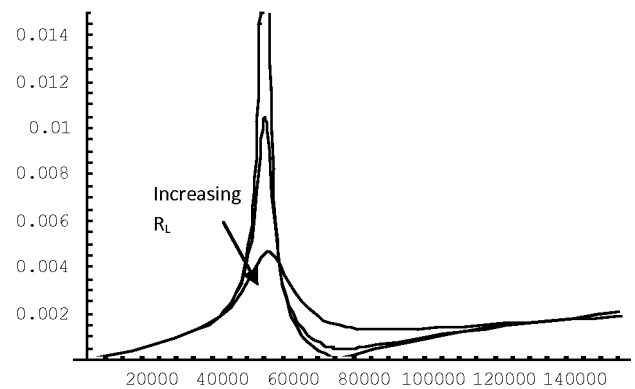
FIG. 4 shows the frequency variation of the admittance, phase angle and load current of the CLC resonant circuit according to the invention.
Figure 4:
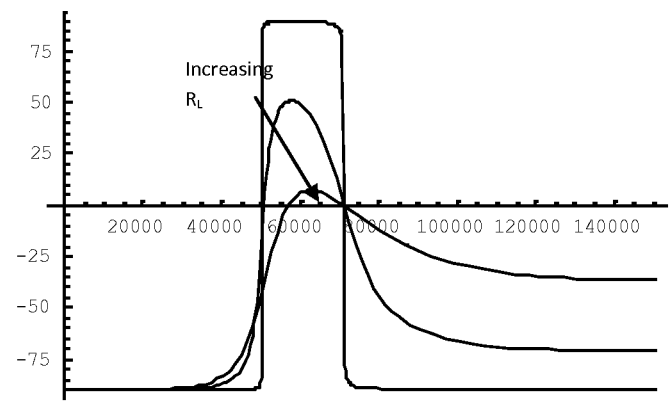
Figure 4:
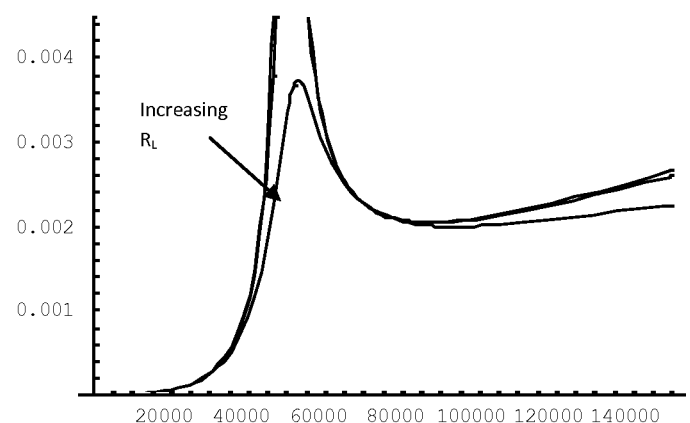

FIG. 4 (a) shows the variation in the magnitude of the admittance of a typical CLC resonant circuit at three different values of load and over a range of frequencies. FIG. 4(b) shows the phase angle of the impedance of the CLC resonant circuit at three different values of load. This circuit is capacitive at low frequency, changing to inductive at the first non-zero resonant frequency and back to capacitive above the upper resonant frequency.

From FIGS. 4(a) and (b) it can be observed that the CLC resonant circuit not have a current path at DC (0 Hz) since it is blocked by the capacitors in the circuit. In FIG. 4(a) a major improvement in the invention over the prior art is shown by the admittance tending towards zero at low frequencies. FIG. 4 (b) illustrates this in that the circuit has a negative phase angle (capacitive impedance) at 0 Hz. The magnitude of the impedance is high at 0 Hz which means that a CLC circuit according to the invention does not allow DC current to pass. This overcomes the second disadvantage of the prior art LCL circuit.

From FIG. 4(b), it can be seen that in a CLC circuit according to the invention the first resonant frequency varies with changes in $R_L$ whereas the second, higher, resonant frequency is constant and independent of the value of $R_L$.

This is the complete inverse of the LCL circuit according to the prior art. The CLC circuit according to the invention can operate with reduced distortion and lower switching losses compared to the prior art LCL circuit when operating in constant current mode. In the CLC circuit according to the invention, it can be seen from FIG. 4(c) that the frequency at which the circuit delivers constant current to the load is the higher of the two resonant frequencies. Driving the circuit at this higher resonant frequency will not excite harmonics since the only other resonance is below the driving frequency. The resonant characteristics of the circuit will therefore be purer, containing a single frequency. The switching characteristics of the circuit will be cleaner than the LCL circuit according to the prior art. This overcomes the third disadvantage of the LCL resonant circuit according to the prior art and allows the CLC circuit to operate with higher efficiency.

Rearranging the equation for the first resonant frequency gives, $$\omega_{1_{CLC}} = \frac{\omega_{2_{CLC}}}{\sqrt{2 - \frac{R_L^2 C_s}{L_p}}} \text{ rad/s}.$$

The first resonant frequency, $\omega_{1_{CLC}}$, of the CLC circuit is less than $\omega_{1_{CLC}}$ providing $$\sqrt{2 - \frac{R_L^2 C_s}{L_p}} > 1$$

i.e. $\frac{R_L^2 C_s}{L_p} < 1$ so $R_L < \sqrt{\frac{L_p}{C_s}}$

Therefore $R_{L_{maxCLC}} = \sqrt{\frac{L_p}{C_s}}$

Comparing the maximum value of $R_L$ for the CLC circuit with the maximum value of the $R_L$ for the LCL circuit of the prior art when both circuits designed to operate in constant current mode with equivalent reactances gives the following ratio:

$$\frac{R_{L_{maxCLC}}}{R_{L_{maxLCL}}} = \frac{\sqrt{\frac{L_p}{C_s}}}{(\sqrt{2}-1)\sqrt{\frac{L_s}{C_p}}} = \frac{1}{(\sqrt{2}-1)} = (\sqrt{2}+1) = 2.414$$

Hence, at an equivalent operating frequency and equivalent reactances, it is can be concluded that the CLC circuit according to the invention can operate with up to 241% of the maximum load resistance RL. This is important when driving electric motors or capacitor charging applications where the equivalent resistance of the load (determined by the ration of output voltage to output current) varies over a significant range. The CLC circuit according to the invention, using similar reactances to the prior art LCL circuit, could drive a motor with constant current over 241% of the speed range compared to prior art circuits.

From another viewpoint the frequency characteristics of the CLC circuit according to the invention are 2.4 times less dependent on the load resistance when compared to the prior art LCL circuit.

Figure 5:
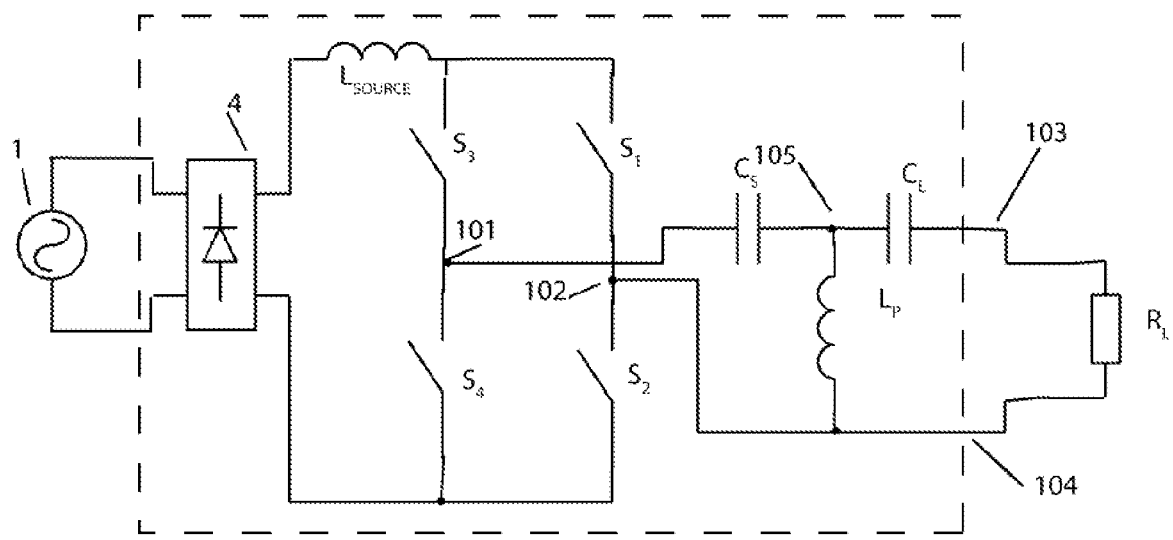
FIG. 5 shows an inverter incorporating a resonant circuit according to the invention.

The complete inverter circuit incorporating a CLC resonant circuit according to the invention is shown in FIG. 5. The resonant circuit has input terminals 101 and 102, and output terminals 103 and 104, with a first capacitor $C_s$, connected from a first input terminal 101 through a common point 105 with second capacitor $C_L$, to a first output terminal 103, the second input terminal 102 being directly connected to the second output terminal 104. A inductor $L_p$, is connected between the common point 105 between the two capacitors and the direct connections between second terminals of input 102 and output 104. The output terminals are connected to a load of apparent impedance $R_L$, the value of the components $C_s$, $C_L$ and $L_p$ being chosen such that at least one frequency, the reactances of $C_s$, $C_L$ and $L_p$ are approximately similar in magnitude.

The inverter circuit to drive the CLC resonant circuit should ideally be a current source inverter. A dc inductor $L_{source}$ creates a relatively constant current source for the inverter. The switches of the inverter then direct this current alternatively in a forward and reverse path through the CLC resonant circuit containing the load. In a first switching state switches S3 and S2 would be conducting, directing the constant current into terminal 101 returning to the power supply through terminal 102. In a second switching state switches S1 and S4 would be conducting, directing the constant current into terminal 102 returning to the power supply through terminal 101. Whilst the current applied to the CLC resonant circuit is a square wave, the voltage across the CLC resonant circuit will be substantially sinusoidal, containing predominantly the fundamental frequency of the driving frequency. The sinusoidal voltage across the circuit eliminates switching losses in the circuit as is well known in the art when using current source inverters to drive parallel resonant loads.

It can be observed that switching of the circuit before or after the sinusoidal voltage across the CLC resonant circuit reaches zero will cause the capacitors $C_s$ and $C_L$ to discharge rapidly causing a spike of current through the switches. This is a problem which is well known in applications such as induction heating current source inverters. In that industry it is common to introduce an additional inductance in series with the resonant circuit to control the rate of change of current.

The CLC circuit according to the invention can easily be adapted to incorporate this improvement. An small additional inductance $L_s$ can be added in series with $C_s$. The value of the capacitance Cs can be increased slightly so that the total value of the reactance Xs at the frequency of operation still satisfies the constant current condition.

$$-X_s = -X_L = X_p$$

$$\frac{1}{\omega_{2_{CLC}} C_s} - \omega_{2_{CLC}} L_s = \frac{1}{\omega_{2_{CLC}} C_L} = \omega_{2_{CLC}} L_p$$

Since the additional inductance Ls is small the losses in the inductor are small and the reduction in overall efficiency of the circuit is minimal.

Control of the power of the circuit can be achieved by controlling the current in the dc inductor Lsource. This is easily done in many ways known to those skilled in the art. A step down dc to dc converter or buck converter can be used to take an uncontrolled dc supply and vary the current in the inductor Lsource.

Figure 6:
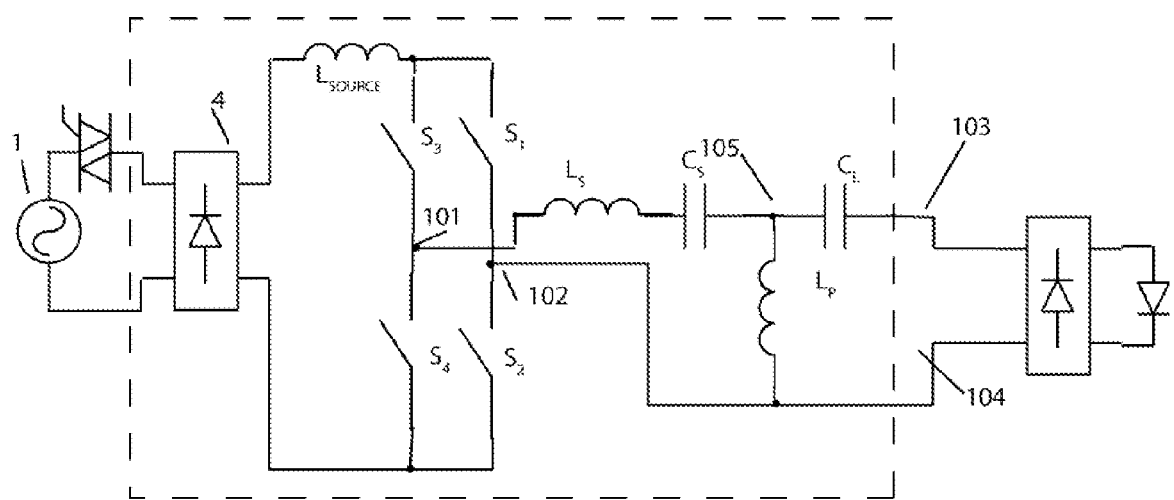
FIG. 6 shows a further inverter incorporating a resonant circuit according to the invention driving an LED array.

Alternatively if the circuit is to be connected to an ac supply, it would be supplied through a rectifier. The inductor Lsource is connected between the rectifier and the CLC inverter. In order to control the power through the circuit the ac supply connected to the rectifier can be controlled with a triac or phase controlled device as shown in FIG. 6. Variation of the firing delay angle of the triac will vary the average current in the inductor Lsource and hence vary the power delivered to the load. It is important to note that under these circumstances the load current is varying in a manner controlled by the triac. However the constant current characteristics mean that at a pre-set source current the current in the load will be determined by the circuit characteristics and not the value of the load resistance.

In a triac controlled version of the circuit the use of the inductor Lsource is ideal to limit the rate of rise of current through the triac. This avoids problems of fast in-rush currents, voltage overshoot and false triggering of the triac which can occur when a triac is used to drive a voltage fed inverter. FIG. 6 also shows the inclusion of the small series inductor Ls in series with the capacitor Cs. The values of Cs and Ls are chosen so that the reactance of Cs and Ls together is still predominantly capacitive in at least part of the operating frequency range of the circuit.

Since the CLC resonant circuit is driven close to the resonant frequency the impedance of the whole inverter to the supply is close to purely resistive. This means that the power factor of the circuit when driven from an ac supply is very high and will approach unity.

In many applications such as capacitor charging, dc motor drives and LED light drivers the current delivered to the load needs to be unidirectional. The load resistance $R_L$ in all the circuits according to the invention can be replaced by a rectifier to rectify the high frequency current through $C_L$ so that dc the current in the load is uni-directional. This aspect of the invention is illustrated in FIG. 6 where the output of the circuit is used to drive a string of LEDs in a lighting application.

Furthermore, the load can be connected through a high frequency transformer. The primary winding of the transformer is connected in series with $C_L$. The load and rectifier, if required, is connected to the isolated secondary winding of the transformer. Since the addition of the transformer adds some inductive reactance in series with the capacitance $C_L$ the value of the capacitor can be altered slightly to maintain the balanced reactances which deliver the constant load current characteristic.

The invention claimed is:

1. An electronic circuit for providing constant current power supply and incorporating a series-parallel resonant circuit with input terminals and output terminals, the series-parallel resonant circuit comprising:
   a first reactance ($X_s$), in series with a first input terminal,
   a second reactance ($X_L$), in series with a load between a first output terminal and a second output terminal, and
   a first inductive reactance ($X_p$), connected in parallel with the second capacitive reactance and the load such that:
      there is a series connection path between the first input terminal through the first capacitive reactance ($X_s$) and the first inductive reactance ($X_p$) to a second input terminal;
      there is a second series connection path between the first output terminal through the second reactance ($X_L$) and the first inductive reactance ($X_p$) to the second output terminal;
      any path from the first input terminal through the load to the second input terminal passes through at least one of the first capacitive reactance and the second capacitive reactance;
   the input terminals being driven from a high frequency inverter,
   the value of the first capacitive, second capacitive and first inductive reactances ($X_s$, $X_L$, $X_p$) being chosen such that at one or more frequencies, the reactances ($X_s$, $X_L$, $X_p$) are approximately similar in magnitude;
   whereby the impedance of the series-parallel resonant circuit is substantially capacitive at low frequency so that the admittance tends towards zero as the frequency tends towards zero.

2. An electronic circuit according to claim 1 wherein the high frequency inverter is a current source inverter.

3. An electronic circuit according to claim 1 wherein the operating frequency of the high frequency inverter is chosen to be close to the frequency where the first capacitive, second capacitive and first inductive reactances ($X_s$, $X_L$, $X_p$) are approximately similar in magnitude.

4. An electronic circuit according to claim 1, wherein the circuit has two resonant frequencies, the circuit providing constant current to the load at the higher of the two resonant frequencies.

* * * * *